(12) United States Patent
Barnes et al.

(10) Patent No.: US 7,710,663 B2
(45) Date of Patent: May 4, 2010

(54) PRISMATIC LENS AND REFLECTOR/REFRACTOR DEVICE FOR LIGHTING FIXTURES HAVING ENHANCED PERFORMANCE CHARACTERISTICS

(75) Inventors: Thomas F. Barnes, Charlevoix, MI (US); Joel E. Robinson, Charlevoix, MI (US); John R. Anthony, Charlevoix, MI (US)

(73) Assignee: A.L.P. Lighting & Ceiling Products, Inc., Niles, IL (US)

( * ) Notice: Subject to any disclaimer, the term of this patent is extended or adjusted under 35 U.S.C. 154(b) by 220 days.

(21) Appl. No.: 12/045,340

(22) Filed: Mar. 10, 2008

(65) Prior Publication Data
US 2009/0225430 A1    Sep. 10, 2009

(51) Int. Cl.
*G02B 3/02* (2006.01)
(52) U.S. Cl. .................. 359/720; 362/309; 362/296
(58) Field of Classification Search .......... 359/720; 362/309, 296, 327, 334, 348, 350
See application file for complete search history.

(56) References Cited

U.S. PATENT DOCUMENTS

| | | | |
|---|---|---|---|
| 4,805,984 A * | 2/1989 | Cobb, Jr. ............... | 385/133 |
| 4,839,781 A | 6/1989 | Barnes et al. | |
| 5,444,606 A | 8/1995 | Barnes et al. | |
| 6,550,938 B2 | 4/2003 | Barnes, II et al. | |
| 6,698,908 B2 | 3/2004 | Sitzema et al. | |
| 6,991,348 B2 * | 1/2006 | Titmarsh ............... | 362/317 |
| 7,025,476 B2 * | 4/2006 | Leadford ............... | 362/309 |
| 2003/0071581 A1 * | 4/2003 | Panagotacos et al. ... | 315/185 R |
| 2007/0249790 A1 | 10/2007 | Kashiwagi et al. | |

* cited by examiner

*Primary Examiner*—Timothy J Thompson
(74) *Attorney, Agent, or Firm*—Joan Pennington

(57) ABSTRACT

A prismatic lens and a reflector/refractor device having enhanced characteristics are provided for lighting fixtures. The prismatic lens and the reflector/refractor device are formed of a silicone material. A prismatic lens member includes a plurality of prisms on a surface thereof for refracting light. The reflector/refractor device includes a plurality of prisms on a surface thereof for reflecting and refracting light. The silicone material forming the prismatic lens and the reflector/refractor device is substantially transparent, and enables forming enhanced optical elements, for example, by injection molding technique. The silicone material is a selected one of dimethylsilicone, phenylmethlysilicone, or similar silicone material enabling enhanced optical performance for the prismatic lens and the reflector/refractor device.

18 Claims, 10 Drawing Sheets

PRISMATIC LENS AND REFLECTOR/REFRACTOR DEVICE FOR LIGHTING FIXTURES HAVING ENHANCED PERFORMANCE CHARACTERISTICS

FIELD OF THE INVENTION

The present invention relates to lighting fixtures and luminaires, and more particularly to a prismatic lens and a reflector/refractor device having improved material properties and performance.

DESCRIPTION OF THE RELATED ART

Various arrangements are known for lighting fixtures and luminaries and prismatic lens and reflector/refractor devices used for lighting fixtures and luminaires.

For example, U.S. Pat. No. 4,839,781 issued to Josh T. Barnes and Ronald J. Sitzema Jun. 13, 1989 discloses a reflector/refractor device for use with a variety of lighting fixtures and light sources. The reflector/refractor device includes a body having a predetermined profile and defining a cavity with the body having an inside surface and an outside surface. An illuminating source for emitting light is disposed within the cavity substantially along a central vertical axis of the body. The body includes a series of sectional zones for reflecting and refracting light. The exterior surface of the device includes a plurality of substantially vertical prisms consisting of reflective elements, refractive elements and elements that may be either reflective or refractive depending on light center location. These reflective or refractive elements act in combination to selectively vary light distribution characteristics of vertical and lateral angles, and intensities, by vertical displacement of the illuminating lamp source.

U.S. Pat. No. 5,444,606 issued to Josh T. Barnes and Paul C. Belding Aug. 22, 1995 discloses a combination of a prismatic reflector and a prismatic lens is provided for use with lighting fixtures. A reflector body has a substantially parabolic contour defining an interior cavity. The reflector body includes a plurality of prisms for receiving, transmitting and reflecting light. A lens body has a first mating surface engaging the reflector body, an opposed inverted conical surface, and a sloping sidewall extending between the mating surface and the opposed inverted conical surface. The mating surface of the lens body has a larger diameter than the opposed inverted conical surface. The opposed inverted conical surface includes a plurality of prisms for receiving and for redirecting light.

U.S. Pat. No. 6,698,908 to Ronald J. Sitzema and Gwen Barber issued Mar. 2, 2004 discloses an optical assembly including a reflector/refractor device and a reflector collar provided for enhanced directional illumination control. The reflector/refractor has a predefined shape and has a plurality of reflector/refractor prisms on an exterior body surface for reflecting and refracting light. A light source is disposed within the reflector/refractor substantially along a central vertical axis of the reflector/refractor. The reflector collar supports the reflector/refractor and attaches the reflector/refractor to a luminaire ballast. The reflector collar has a predetermined contour and a plurality of reflector impressions formed into the predetermined contour. The predetermined contour and the plurality of reflector impressions provide directional illumination control for the optical assembly.

U.S. Pat. No. 6,550,938 to Thomas F. Barnes, II and James T. Hamilton issued Apr. 22, 2003 discloses a reflector and lighting fixture having both a transmitted and reflected light component employing a polymeric material which has an appearance, in varying degrees, of white. The material has internal elements which can be varied to be either highly reflective or permit efficient diffuse transmission of incident light rays. The ratio of reflected to transmitted light and the degree of diffusion is tailored to the application, light source and desired appearance. The material is adapted for providing a selected diffuse transmission component of a total fixture output. The material provides a set diffuse transmission component of greater than 1% and less than 25% where the material is formed by pigmenting a transparent material with a white pigment. The material provides a set diffuse transmission component of greater than 1% and less than 99% where the material is formed by a foamed polymeric material, by an expanded bead material, by blending transparent materials having different refractive indices, or by adding a filler to a polymeric material.

The above and other lenses and reflectors typically are assembled to the fixture using a clamp band, which is usually metal, but may also be elastomeric, collar, or other hardware which is not integral to the optical component, or that requires secondary operations to provide an assembly mechanism.

One limiting factor in the application of all polymeric lenses and reflectors is the maximum operating temperature, above which the lens or reflector will exhibit premature yellowing, distortion, melting, and the like. All commonly used polymeric lenses and reflectors in lighting fixtures are thermoplastic, having the property of being subject to softening when heated excessively. The highest maximum operating temperature for commonly used clear thermoplastic materials is 80° C. (acrylic). It is desirable that a clear polymeric material should be available with a higher continuous service temperature.

While the reflectors, prismatic lens and reflector/refractor devices disclosed by the above-identified patents provide improvements over prior art arrangements, it is desirable to provide an improved prismatic lens and an improved reflector/refractor device, both having improved material properties and performance.

As used in the following description and claims, the terms prisms and prismatic should be understood to include prismatic elements, discrete optics, holographic optics, and biased textures.

SUMMARY OF THE INVENTION

Principal aspects of the present invention are to provide a prismatic lens and reflector/refractor device having improved material properties and performance. Other important aspects of the present invention are to provide such prismatic lens and reflector/refractor device having improved material properties and performance, substantially without negative effect and that overcome many of the disadvantages of prior art arrangements.

In brief, a prismatic lens having improved material properties and performance is provided. A prismatic lens for lighting fixtures includes a lens member formed of a silicone material. The lens member has a predetermined shape and includes a plurality of prisms on a surface thereof for refracting light. The lens member includes an integral flange for mounting with a lighting fixture.

A reflector/refractor device having improved material properties and performance is provided. A reflector/refractor device includes a unitary member formed of a silicone material. The unitary member has a predetermined shape and includes a plurality of prisms on a surface thereof for reflecting and refracting light.

In accordance with features of the invention, the prismatic lens and reflector/refractor device is molded of the silicone material, and the prismatic lens is substantially transparent providing excellent optical clarity and transmission, and non-yellowing characteristics. The prismatic lens and reflector/refractor device have high flexibility characteristics, and enable high temperature operation. The silicone material includes a selected one of dimethylsilicone or phenylmethlysilicone. The silicone material forming the prismatic lens provides enhanced refractive properties for the prisms.

In accordance with features of the invention, the prismatic lens includes prisms or optical elements with peak and root radii implemented as discrete optics, holographic optics or biased textures. The reflector/refractor device includes vertical prisms for reflecting and refracting light. The prismatic lens and reflector/refractor device enable operating temperature of at least 100° C.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
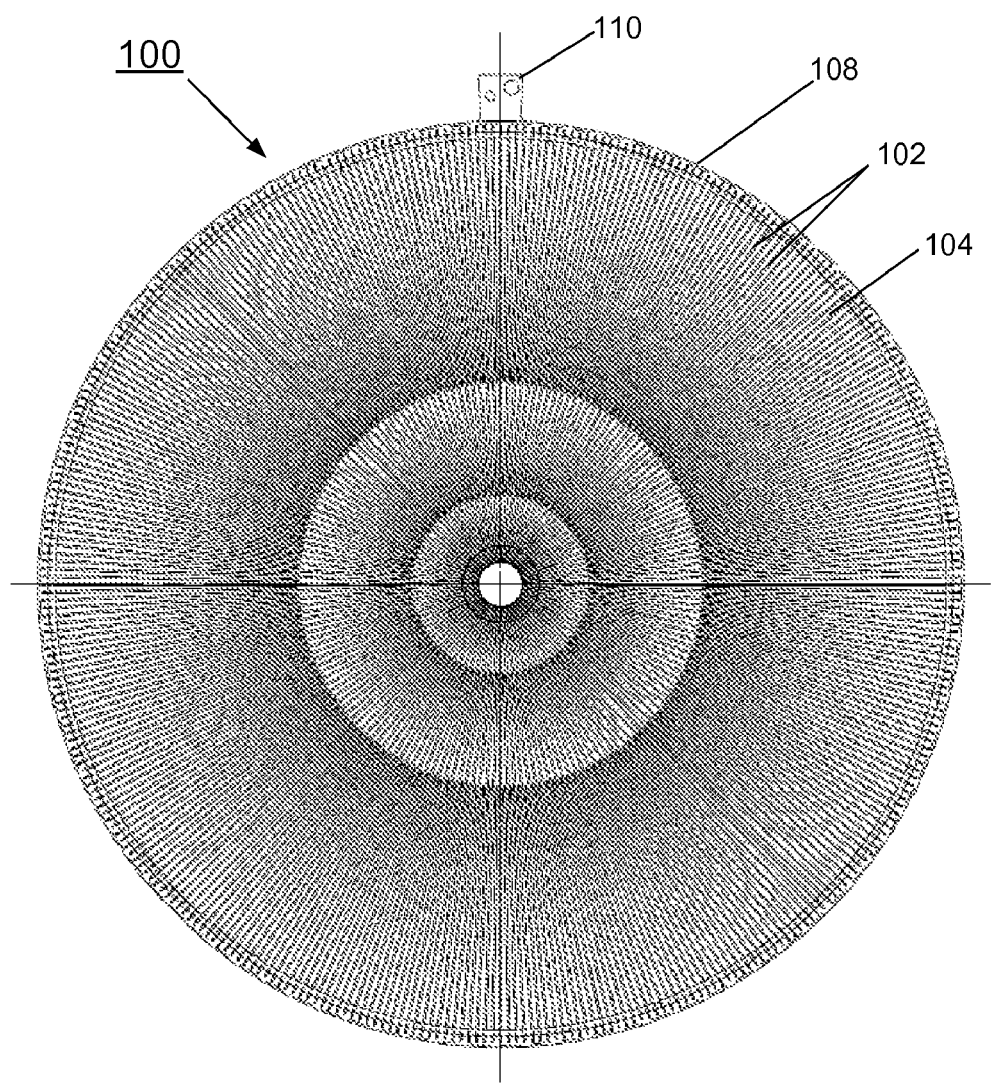
FIG. 1 is a plan view not to scale illustrating an exemplary prismatic lens in accordance with the preferred embodiment.
Figure 9:
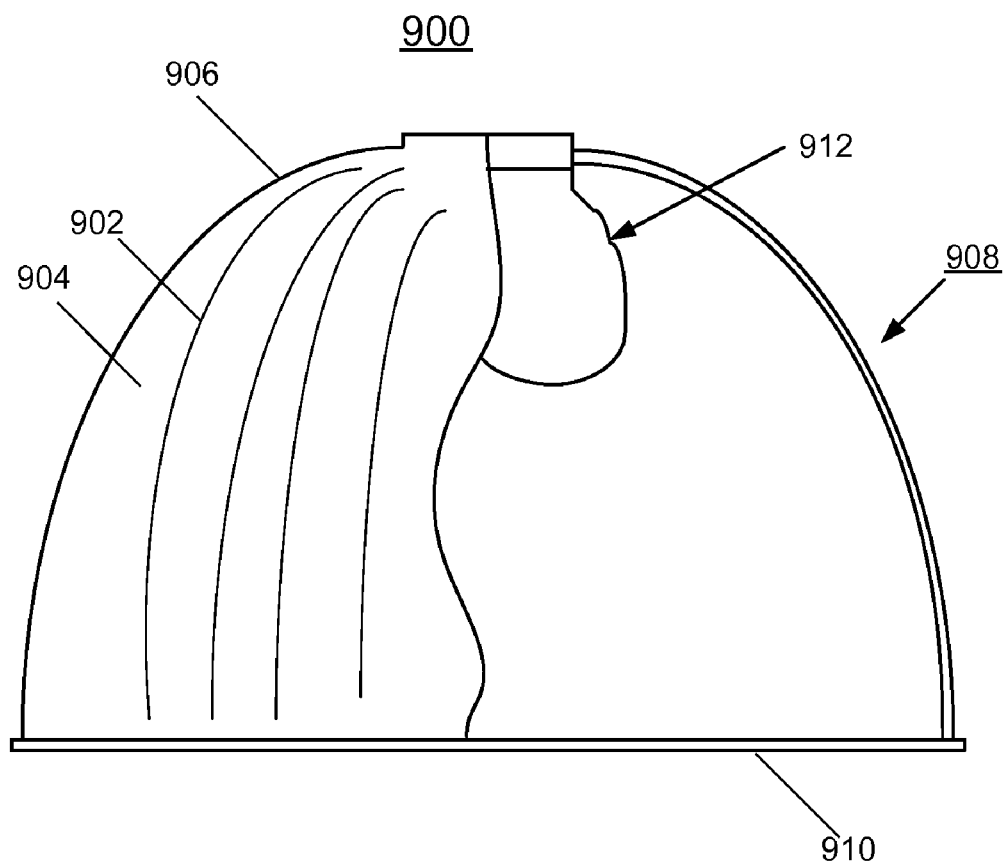
FIG. 9 is a side view not to scale partly broken away illustrating an exemplary prismatic reflector/refractor device in accordance with the preferred embodiment.

Having reference now to the drawings, in FIG. 1, there is shown an exemplary prismatic lens generally designated by the reference character 100 in accordance with the preferred embodiment. Referring also to FIG. 9, there is shown an exemplary prismatic reflector/refractor device generally designated by the reference character 900 in accordance with the preferred embodiment.

In accordance with features of the invention, each of the prismatic lens 100 and the prismatic reflector/refractor device 900 is formed of a silicone material that is a substantially transparent light transmitting material, providing excellent optical clarity and transmission, and non-yellowing characteristics. The prismatic lens 100 and reflector/refractor device 900 have high flexibility characteristics. For example, a dimethylsilicone or phenylmethlysilicone or other silicone having similar properties forms the prismatic lens 100, and forms the prismatic reflector/refractor device 900.

In accordance with features of the invention, the prismatic lens 100 and prismatic reflector/refractor device 900 are substantially clear, whereas most silicone products typically are hazy. This feature of the prismatic lens 100 and prismatic reflector/refractor device 900 is provided by a combination of the material properties and a finish on a respective mold used for forming the prismatic lens 100 and the prismatic reflector/refractor device 900.

In accordance with features of the invention, the silicone material forming both the prismatic lens 100 and the prismatic reflector/refractor device 900 enables an elevated continuous service temperature, which allows the prismatic lens 100 and the prismatic reflector/refractor device 900 to be used in applications previously too hot for conventional polymers. The silicone material forming the prismatic reflector/refractor device 900 has excellent refractive properties enabling enhanced performance.

Figure 2:
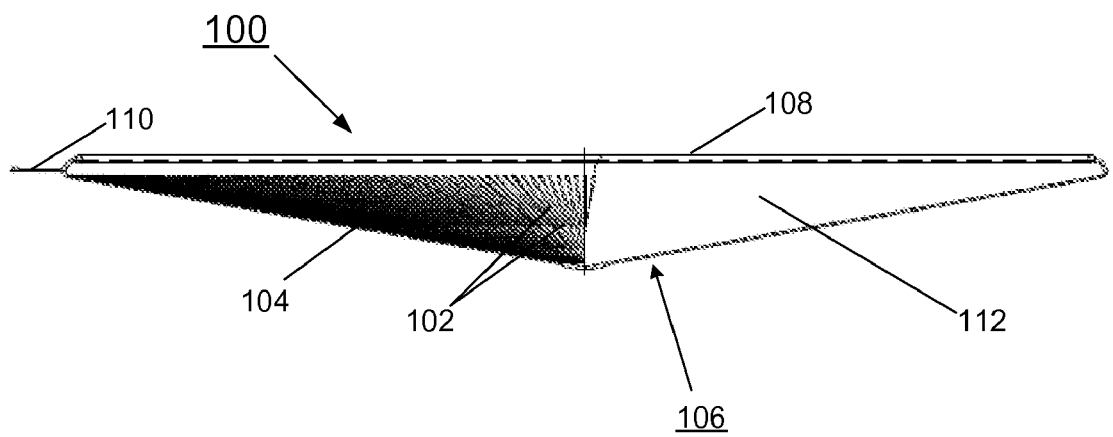
FIG. 2 is a side view not to scale partly broken away illustrating interior details of the prismatic lens of FIG. 1 in accordance with the preferred embodiment.

Referring also to FIG. 2, the prismatic lens 100 includes a plurality of prisms 102 on an interior surface 104 thereof for refracting light. The prismatic lens 100 has a predetermined shape generally designated by reference character 106.

It should be understood that the prismatic lens 100 of the invention is not limited to the illustrated shape 106 or conical drop lens configuration. For example, the prismatic lens 100 could have other configurations, such as a pan shape, bowl, or generally flat configuration.

In accordance with features of the invention, the prismatic lens 100 provides a self-attachment feature, coupled with the flexibility of the material, allowing the prismatic lens to be self-gasketing with an associated reflector/refractor device 900, housing, or other member of a mating lighting fixture (not shown). The prismatic lens 100 is stretched for mounting on the associated light fixture component such that the low durometer or flexibility of the silicone material does not allowed the lens to sag undesirably.

The prismatic lens 100 includes an integral flange 108 for mounting with an associated lighting fixture member. The flange 108 is integrally molded with the prismatic lens 100 and has tabs 110 formed for ease of stretching the lens 100 either for assembly or disassembly with an associated light fixture component. As shown, an outside or exterior surface 112 is substantially smooth.

The prismatic lens 100 is formed, for example, by injection molding technique. The prismatic lens 100 is designed to the fit over an exterior surface of an associated lighting fixture component (not shown). The integrally molded flange 108 is stretched over a mating flange of the associated housing or reflector in order to provide substantial rigidity and/or to provide a dust tight, air tight, water tight or similar seal against the housing.

It should be understood that the integrally molded flange 108 can include a separate structural frame attached which serves to rigidize the lens and provide a rigid flange for attaching to a reflector and/or housing.

Figure 3:
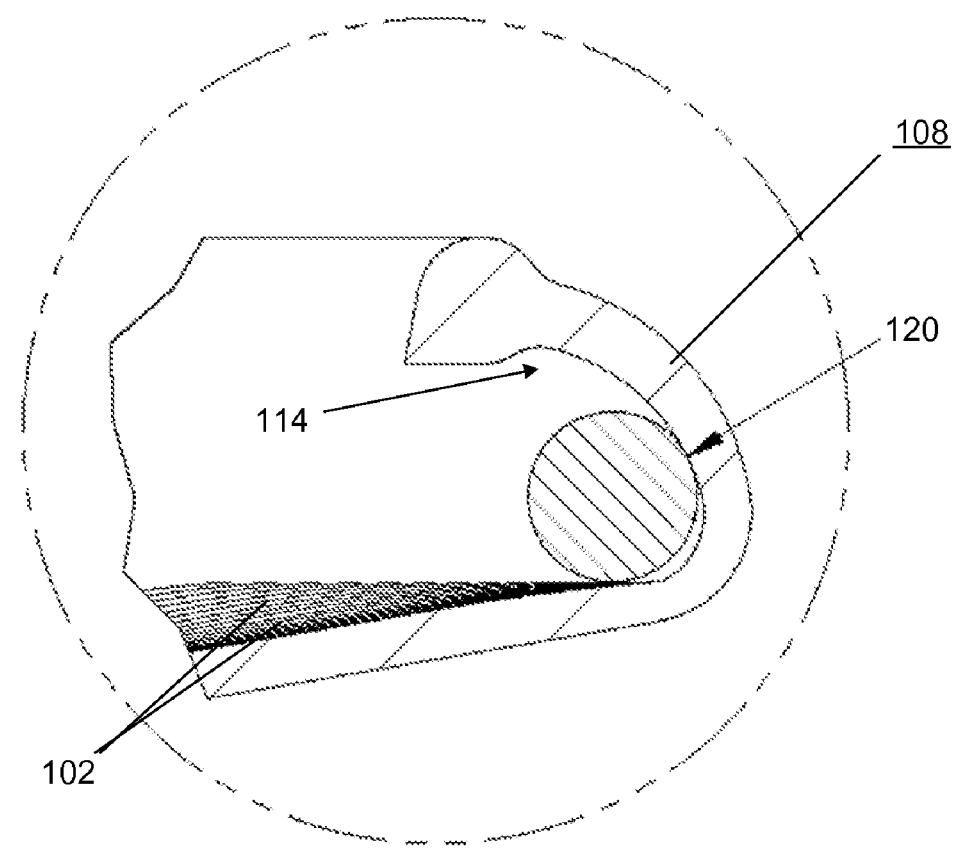
FIG. 3 is an enlarged fragmentary view illustrating not to scale an integral flange of the prismatic lens of FIG. 1 in accordance with the preferred embodiment.

Referring also to FIG. 3, there is shown an enlarged fragmentary view illustrating not to scale the integral flange 108 of the prismatic lens 100 in accordance with the preferred embodiment. The flange 108 of the prismatic lens 100 advantageously includes a molding undercut configuration generally designated by 114.

A secondary member 120 optionally is mounted with the integral flange 108. The optional secondary member 120 provides rigidity for the prismatic lens 100 by inclusion with the flange 108. The secondary member 120 is arranged for mounting with an associated lighting fixture and is formed, for example, by a steel ring, a molded plastic frame, or the like.

In accordance with features of the invention, the prismatic lens 100 including molding undercuts 114 in the integral mounting flange 108, which is not normally economical or even possible with other polymeric materials, enables enhanced assembly performance for the prismatic lens 100. The prismatic lens 100 includes the pull-tabs 110 that provide an area to grip the lens to assist in pulling the prismatic lens 100 to install and remove the prismatic lens from the associated reflector or housing of the lighting fixture.

Figure 4:
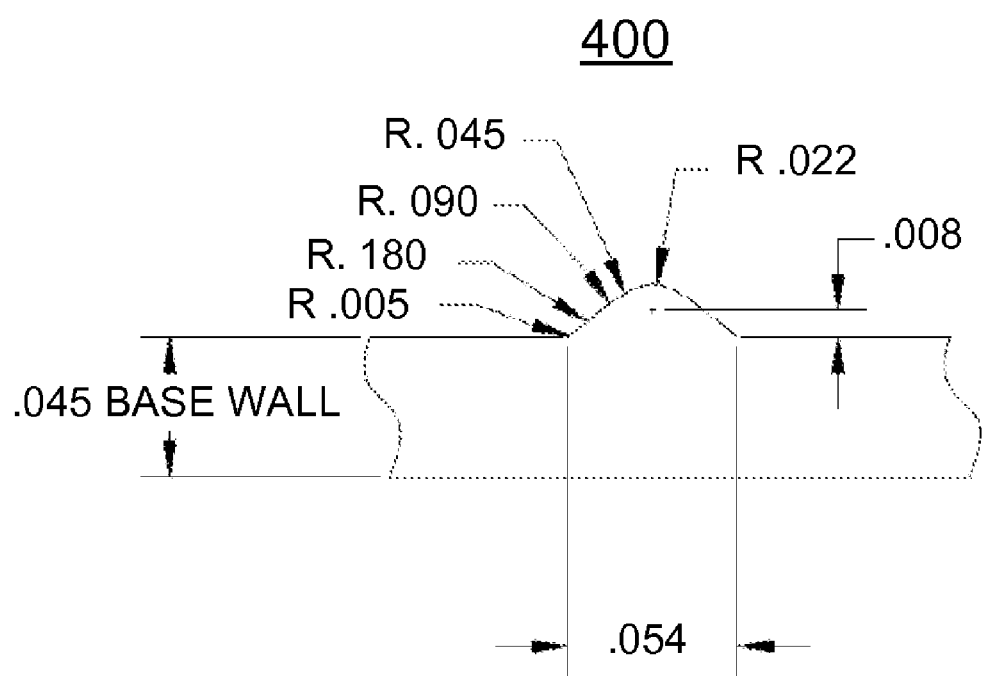
FIGS. 4, 5, and 6 are enlarged fragmentary views illustrating not to scale prism elements of the prismatic lens of FIG. 1 in accordance with the preferred embodiment.
Figure 5:
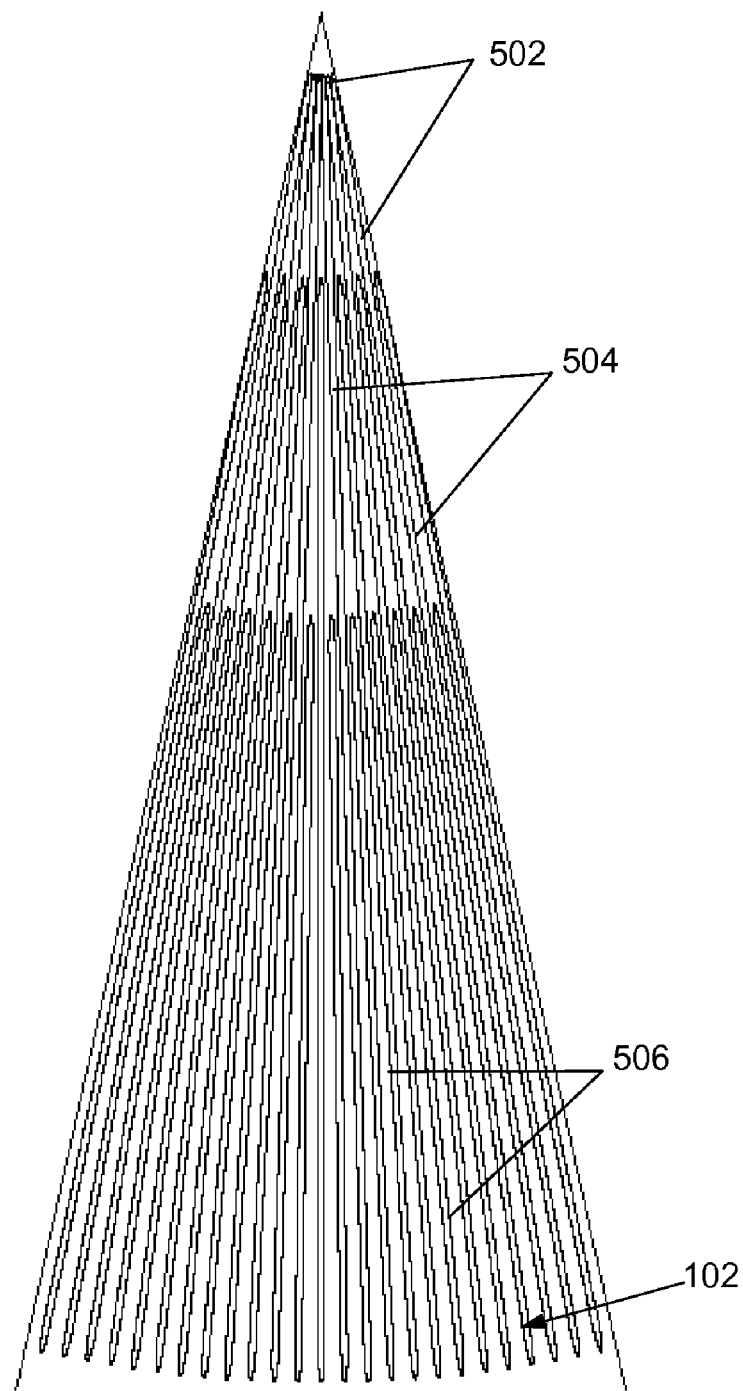
Figure 6:
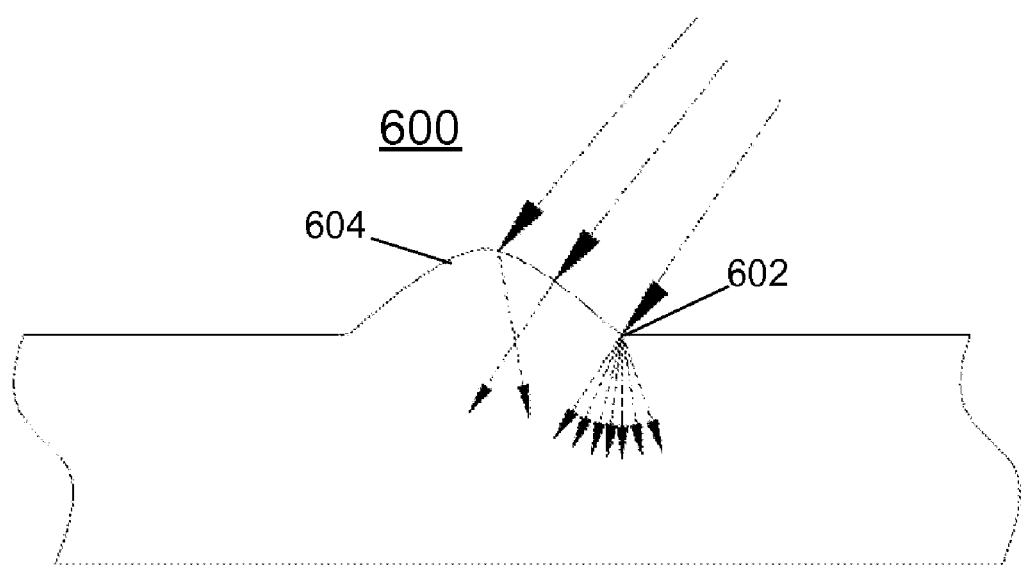

Referring also to FIGS. 4, 5, and 6, the prismatic lens 100 of the preferred embodiment has a plurality of radial prisms 102. The prisms are formed on the inside or interior surface 104 extending between an upper flange 108 and a lower body portion as shown in FIGS. 1 and 2.

As illustrated in FIG. 4, an exemplary prism generally designated by reference character 400 includes a series of radii, as shown with an overall 0.054 inch width and is formed with an exemplary base wall thickness of 0.045 inch for the prismatic lens 100.

In FIG. 5, there is shown an exemplary prism section generally designated by reference character 500 includes a series of zones 502, 504, 506, as shown of the prismatic lens 100.

In FIG. 6, there is shown an exemplary prism generally designated by reference character 600 that includes a respective peak and root radii 602, 604 for the prismatic lens 100 with arrows indicating refractive performance for the prism 600.

In accordance with features of the invention, the prismatic lens 100 includes prisms or optical elements with peak and root radii 602, 604 that can be significantly smaller than conventional prisms formed on prior art devices, and the prisms can be implemented, for example, as discrete optics, holographic optics or biased textures.

Figure 7:
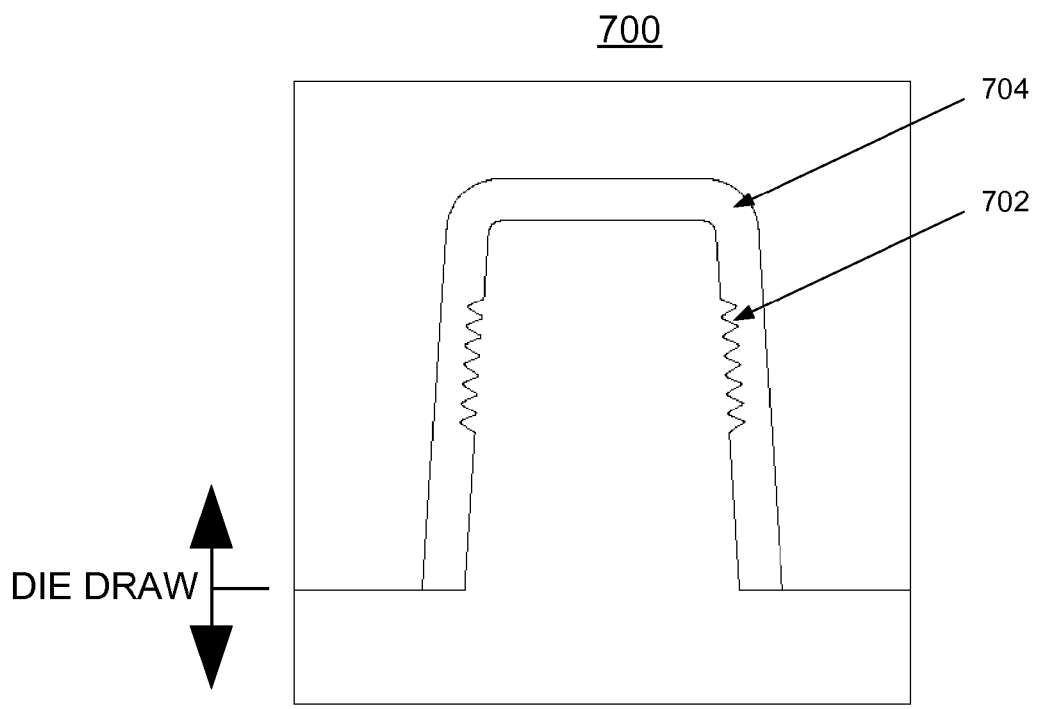
FIG. 7 illustrates an exemplary mold arrangement for forming the undercut prisms of the prismatic lens of FIG. 1 in accordance with a preferred embodiment

Referring also FIG. 7, there is shown an exemplary mold arrangement generally designated by reference character 700. The arrowed line labeled DIE DRAW indicates a die draw line. The mold arrangement 700 includes large features 702, and small features 704, for example, for defining prismatic elements. Conventional molding of rigid thermoplastic materials requires mold construction where all optics and feature are removable from the tool without interference with mold steel. Any feature that requires the steel to move out of the way before the part can be removed is called an undercut condition. The silicone being of a flexible material can be removed from the mold undercuts without destroying the part. This allows the part designer more freedom in designing both prismatic elements and mechanical elements. The prisms 102 advantageously can have a draft angle less than or equal to 0° and/or the prism features are otherwise undercut.

Figure 8:
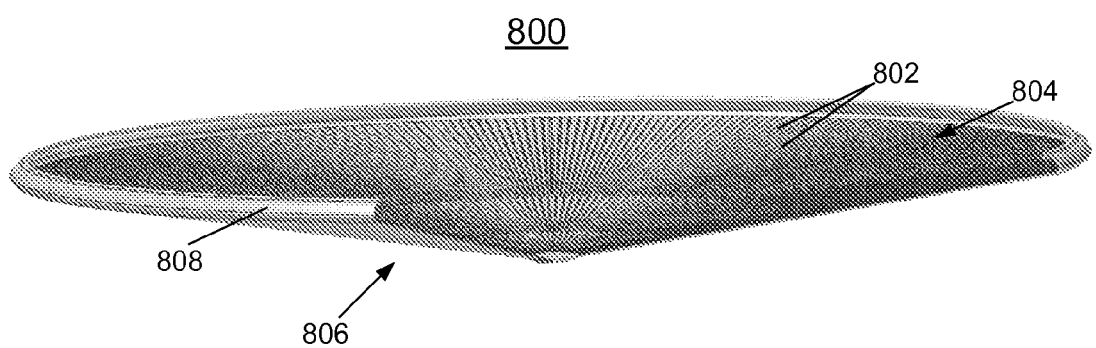
FIG. 8 is a section view not to scale partly broken away illustrating a prismatic lens in accordance with the preferred embodiment.

Referring to FIG. 8, there is shown a partly cut-away view to show interior detail of an exemplary prismatic lens generally designated by reference character 800 in accordance with a preferred embodiment. The prismatic lens 800 includes a plurality of prisms 802 on an interior surface 804 thereof for reflecting and refracting light. The prismatic lens 800 has a predetermined shape generally designated by reference character 806. The prismatic lens 800 includes an integral flange 808 for mounting with a lighting fixture. The flange 808 is integrally molded with the prismatic lens 800.

Referring to FIG. 9, the exemplary prismatic reflector/refractor device 900 in accordance with the preferred embodiment includes a plurality of prisms 902 for reflecting and refracting light formed on an exterior surface 904 thereof. A unitary member 906 formed of a silicone material defines the prismatic reflector/refractor device 900, which is substantially transparent and enabling an operating temperature of at least 100° C. The prisms 902 include, for example, vertical prisms for reflecting and refracting light.

The unitary member 906 has a predetermined shape generally designated by reference character 908, such as the illustrated bowl-shaped profile. However, it should be understood that the prismatic reflector/refractor device 900 could have various other selected shapes. The prismatic reflector/refractor device 900 includes a lower rim 910. An illumination or light source or lamp 912 is disposed inside the prismatic reflector/refractor device 900. Various commercially available lamps can be employed for the light source 912, for example, a high intensity discharge lamp, arc tube device, compact fluorescent source, light emitting diode (LED), or other solid state device.

The prismatic reflector/refractor device 900 can be used with the prismatic lens 102. For example, the lower rim 910 is received in mating engagement with the flange 108 of the prismatic lens 100 or with the flange 808 of prismatic lens 800.

Enhanced freedom is allowed in designing both mechanical elements and prismatic elements as result of the flexibility characteristics of the silicone material forming the prismatic reflector/refractor device 900. The prisms 902 can have a draft angle less than or equal to 0° and/or the prism features are otherwise undercut, enabled by the flexibility characteristics of the silicone material forming the prismatic reflector/refractor device 900.

Figure 10:
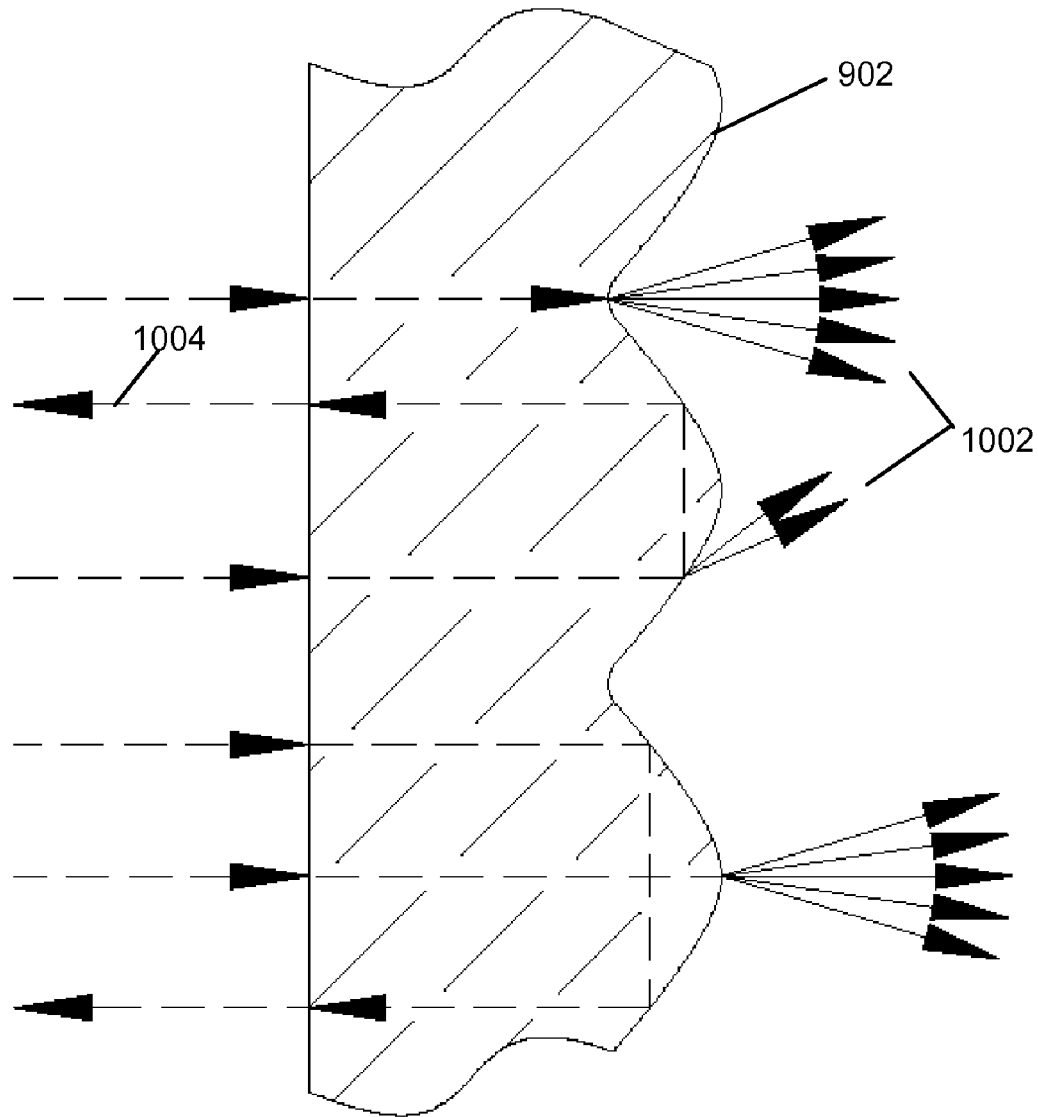
FIG. 10 is an enlarged fragmentary view illustrating not to scale prism elements of the prismatic reflector/refractor device of FIG. 9 in accordance with the preferred embodiment.

FIG. 10 is an enlarged fragmentary view illustrating exemplary prisms generally designated by reference character 1000, for example, forming the prism elements 902 of the prismatic reflector/refractor device 900 in accordance with the preferred embodiment. As shown, the prisms 1000 are arranged for reflecting and refracting light, as indicated by light ray paths labeled 1002, 1004.

While the present invention has been described with reference to the details of the embodiments of the invention shown in the drawing, these details are not intended to limit the scope of the invention as claimed in the appended claims.

What is claimed is:

1. A prismatic lens for lighting fixtures comprising:
a unitary prismatic lens member formed of a silicone material;
said prismatic lens member having a predetermined shape;
said prismatic lens member including a plurality of integrally formed prisms for refracting light; and
said prismatic lens member formed of said silicone material enabling an operating temperature of at least 100° C.

2. The prismatic lens for lighting fixtures as recited in claim 1 wherein said prismatic lens member is formed by molding of said silicone material, said prismatic lens member is substantially transparent, and provides optical clarity, high transmission, and non-yellowing characteristics.

3. The prismatic lens for lighting fixtures as recited in claim 1 wherein said silicone material includes dimethylsilicone.

4. The prismatic lens for lighting fixtures as recited in claim 1 claim 1 said silicone material includes phenylmethlysilicone.

5. The prismatic lens for lighting fixtures as recited in claim 1 wherein said plurality of integrally formed prisms for refracting light is formed on a surface of said prismatic lens member.

6. The prismatic lens for lighting fixtures as recited in claim 1 wherein said integrally formed prisms are radial prisms.

7. The prismatic lens for lighting fixtures as recited in claim 1 wherein said integrally formed prisms include undercut prism features.

8. The prismatic lens for lighting fixtures as recited in claim 1 wherein said prismatic lens member includes an integral flange for mounting with a lighting fixture.

9. A reflector/refractor device for lighting fixtures comprising:
a unitary member formed of a silicone material;
said unitary member having a predetermined shape;
said unitary member including a plurality of prisms for reflecting and refracting light; and
said unitary member being substantially transparent and enabling an operating temperature of at least 100° C.

10. The reflector/refractor device for lighting fixtures as recited in claim 9 wherein said plurality of integrally formed prisms for reflecting and refracting light include vertical prisms.

11. The reflector/refractor device for lighting fixtures as recited in claim 9 wherein said member is formed by molding of said silicone material, said prismatic lens member is substantially transparent, and provides optical clarity, high transmission, and non-yellowing characteristics.

12. The reflector/refractor device for lighting fixtures as recited in claim 9 wherein said silicone material includes phenylmethlysilicone.

13. The reflector/refractor device for lighting fixtures as recited in claim 9 wherein said silicone material includes dimethylsilicone.

14. A prismatic lens for lighting fixtures comprising:
a unitary prismatic lens member formed of a silicone material;
said prismatic lens member having a predetermined shape;
said prismatic lens member including a plurality of integrally formed prisms for refracting light;
said prismatic lens member including an integrally formed flange for mounting with a lighting fixture; and
a second member mounted to said integrally formed flange, said second member being a rigid member.

15. The prismatic lens for lighting fixtures as recited in claim 14 wherein said integrally formed flange includes an undercut configuration.

16. The prismatic lens for lighting fixtures as recited in claim 14 wherein said integrally formed flange includes a tab portion, said tab portion extending outwardly for use in assembly or disassembly of said prismatic lens member with an associated light fixture component.

17. The prismatic lens for lighting fixtures as recited in claim 14 wherein said prismatic lens member is formed by molding of said silicone material and is substantially transparent.

18. The prismatic lens for lighting fixtures as recited in claim 14 wherein said prismatic lens member is a flexible member, and said integrally formed prisms include undercut prism features.

* * * * *